United States Patent Office 2,917,520
Patented Dec. 15, 1959

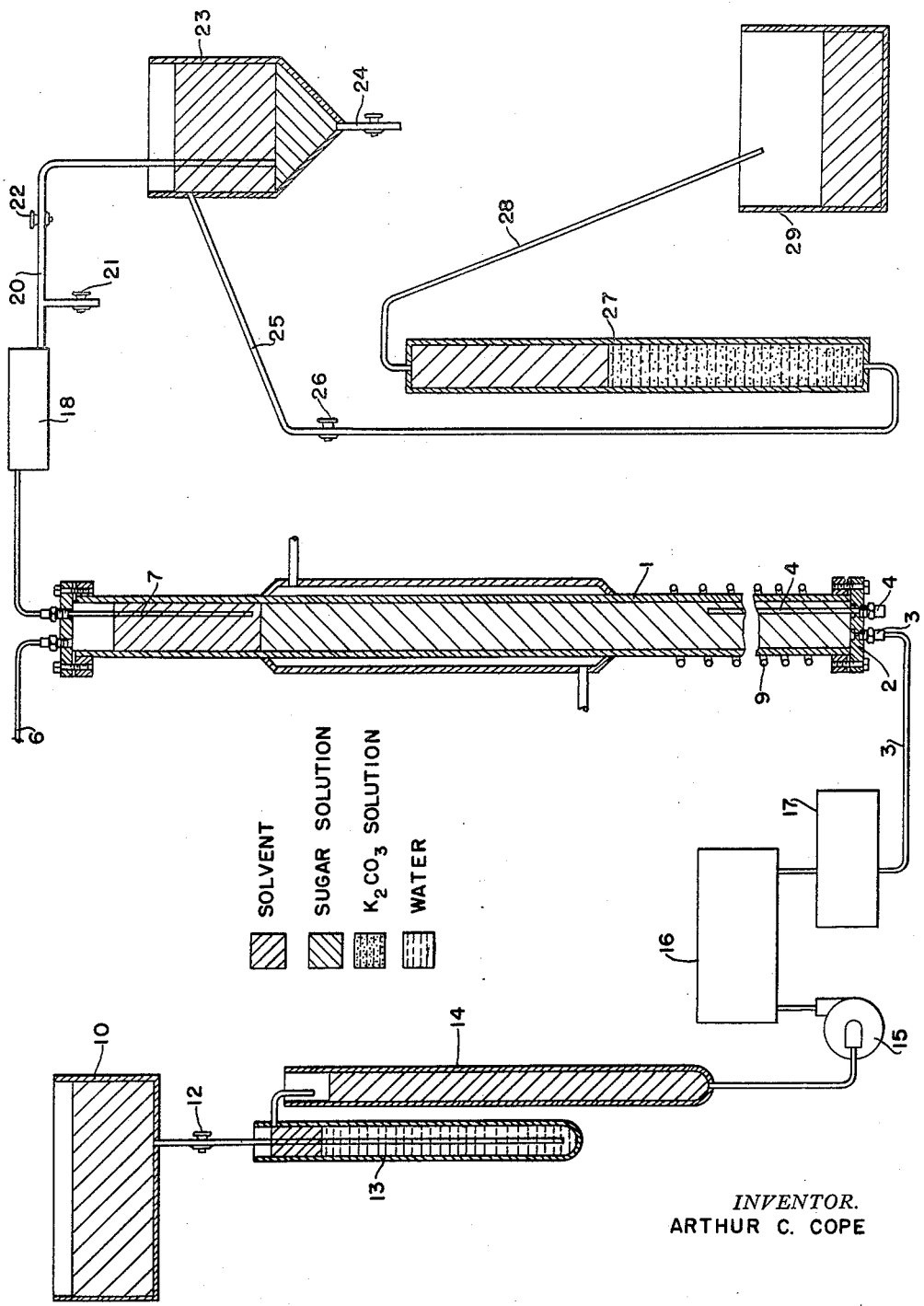

2,917,520
PRODUCTION AND RECOVERY OF FURANS

Arthur C. Cope, Belmont, Mass.

Application September 11, 1957, Serial No. 683,244

4 Claims. (Cl. 260—347.8)

This invention relates to the production of 5-hydroxymethyl furfural (HMF) and has for its object the provision of certain improvements in operations carried out for the conversion of sugar into HMF. In processes in which such sugars as invert sugar, glucose, fructosans, fructose or sucrose, and hydrolyzed wood, or starch (hereinafter called sugar) are converted while in aqueous solution and at an elevated temperature to HMF, there is an accompanying formation of humin, a material which seriously reduces the yield and recovery of HMF. The use of acid catalysts in the aqueous sugar solutions which are heated to elevated temperatures is conducive to the decomposition of the HMF to humin.

Humin is a brown to black, fluffy solid polymeric substance almost completely insoluble in water, caustic, acids and organic solvents of all types. It coats the sides of the reaction vessels and serves as an efficient thermal insulator, thereby causing poor heat transfer. It also induces emulsification of the aqueous phase with various extraction solvents and complicates the HMF recovery problem. In operations carried out in the temperature range of 160° C. to 180° C. there is a good conversion to HMF but the large amount of humin seriously reduces the yield and complicates the recovery.

My invention is based on the discovery that removal of the HMF from the sugar solution as it is formed results in an increase in yield and a decrease in the amount of humin in comparison with prior practices. I have found that the removal of the HMF from the aqueous solution continuously as it is formed by solvent extraction results in a very substantial increase in HMF yield. It is advantageous and important to use a solvent having the following characteristics:

(a) Reasonable distribution coefficient for HMF between water and solvent (HMF is miscible with water);
(b) Stable toward dilute aqueous acids at 175° C.;
(c) Low solubility of solvent in water and of the water in the solvent;
(d) For convenient handling and recovery, the boiling point of the solvent should lie between 100° and 175° C.;
(e) Non-reactive with water, sugar or HMF at 175 C.

The following solvents have been found to be effective: methyl isobutyl ketone, n-hexanol, diethyl ether and diethyl ketone. Methyl isobutyl ketone is preferred because of its commercial availability, low cost and favorable distribution coefficient of 0.79

$$\frac{\text{(HMF concentration in water)}}{\text{(HMF concentration in methyl isobutyl ketone)}}$$

Any suitable type of apparatus may be used to carry out the process of the invention either in a batch type operation or in a continuous type operation.

The single figure of the accompanying drawings is a side view with parts in section illustrating diagrammatically an arrangement of apparatus which may be used for carrying out a process of the invention.

The apparatus comprises a reactor vessel 1 in the form of a tube about 8 feet long and 2 inches in diameter having a bottom end closure 2 in which are attached an entrance pipe 3 and a thermocouple well 4, and a top closure 5 in which are attached a gage, nitrogen supply and safety valve connector 6, and an outlet pipe 7 that extends into the reactor. The reactor tube is preferably formed of stainless steel and has a surrounding jacket 8 near its top for the circulation of water to control the temperature of the mixture. The lower portion where the reaction takes place has a winding of resistance wire 9 for heating the reaction zone to the desired temperature. The top portion of the reactor has a settling section, the proportions of which are determined by the volume of sugar solution, wherein the bulk of the aqueous phase separates from the solvent.

A solvent storage tank 10 is located considerably above the bottom of the reactor 1 and has a pipe 11, with a needle valve 12, leading to a water saturator 13 and standpipe 14. The standpipe is connected to pump 15 which is connected through a steam heat-exchanger 16 and an oil bath 17 to the pipe 3. The pipe 7 connects through a cooler 18 to the pipe 20 which has a sampling valve 21 and a flow control needle valve 22. Pipe 20 extends to the lower portion of the settling tank 23. The settling tank has a drain pipe and valve 24 for removing separated sugar solution which is returned to the system, and a pipe 25, with a flow control needle valve 26, connecting the lower portion of a wash tower 27, the upper portion of which is connected by pipe 28 to storage tank 29.

The following example will be described with reference to the apparatus of the drawing and as illustrating a typical operation carried out in accordance with the invention.

Example 1

About 3 kilograms of sugar solution containing about 50% by weight of sucrose was introduced into the reactor to fill it to the approximate level indicated in the drawing. The solvent methyl isobutyl ketone from the storage tank 10 was flowed through the water saturator 13 into the stand pipe 14 from which it was pumped through the heat exchanger 16 and hot oil bath 17 wherein it was heated to a temperature of about 140° C., and then through pipe 3 into the bottom of the reactor. About 60 liters of the solvent were circulated through the sucrose solution and the mixture was heated to the reaction temperature of about 160° C. Efficient contact between the heated solvent and the sugar solution was obtained without emulsification by adjustment of the flow rate and temperature. It will be noted with reference to the drawing that there is an accumulation of solvent containing the HMF at the upper portion of the reactor. The solvent layer at the top of the reactor was removed through pipe 7, cooled as it flowed through cooler 18, and passed through pipe 20 and valve 22 into the settling tank 23. The sugar solution that separated in this tank was removed through pipe 24 and returned to the process. The solvent layer containing HMF was passed through pipe 25 and valve 26 and into the bottom of the wash tower 27 which contains a solution of potassium carbonate to provide a mild alkaline wash and neutralize residual acidity. The neutralized solution containing the HMF from the wash tower 27 passes through pipe 28 into tank 29.

When the concentration of HMF in the solvent effluent falls to about 3 grams per liter, the system is shut down. The operation carried out under the aforementioned conditions requires about 9 hours and results in a yield of distilled HMF of about 63%. When this operation is carried out without the solvent extraction, the yield of distilled HMF is from 20 to 25%.

There is no acid catalyst used in the process of the invention. The only acid in the system is that accompanying the conversion of the sugar to HMF, and at temperatures in the range of 160 to 180° C., the pH may be about 3.

The solution of HMF in the methyl isobutyl ketone of tank 29 was concentrated in a Turba-Film evaporator. Two passes of the solution were made through the evaporator to reduce the volume of solution from 39 liters to about 2 liters. About 30 minutes were required for the concentration at a pressure of 180 mm. and a steam pressure of about 3 p.s.i.g. The temperature of the vapor was 70° C., the concentrate was 73° C., and the condensate 18° C.

The final concentration was carried out in laboratory glass equipment. After removal of residual solvent and a low boiling fraction, HMF was distilled at 118° C. and 0.4 mm. pressure.

Example II

The same equipment, solvent, sugar solution and procedure as in Example I was used except that the reaction temperature was 170° C., and the reaction time was 6 hours. The yield of distilled HMF using 50 liters of solvent was 57%.

This operation was repeated at 182° C. for four hours, using 40 liters of the solvent to obtain a yield of 58%.

Example III

Using the same equipment and procedure as in Example I, 3 kilograms of a 50% by weight aqueous solution of glucose, and 60 liters of methyl isobutyl ketone were used at a reaction temperature of 160° C.–180° C. The yield of distilled HMF was 21 to 25% compared with a yield of 5–6% when no solvent was used. The rate of formation of HMF from glucose is lower than from fructose or sucrose; hence more decomposition of HMF occurs and the effect of continuous solvent extraction is more pronounced.

I claim:
1. In the production of 5-hydroxymethyl furfural from aqueous sugar solutions heated to an elevated temperature to dehydrate the sugar to 5-hydroxymethyl furfural and in which 5-hydroxymethyl furfural decomposes to form humin, the improved process which comprises maintaining in contact with the sugar solution an organic solvent for 5-hydroxymethy furfural of the group consisting of methyl isobutyl ketone, n-hexanol, diethyl ether, and diethyl ketone, said solvent having low miscibility with water, removing from the aqueous phase 5-hydroxymethyl furfural in the solvent as it is formed, separating the solvent and its dissolved 5-hydroxymethyl furfural from the water phase, and recovering the 5-hydroxymethyl furfural from the solvent, whereby the formation of humin is diminished and the yield of 5-hydroxymethyl furfural is increased.

2. In the process of claim 1, heating the aqueous solution to a temperature in the range of from 160 to 180° C.

3. In the process of claim 1, circulating the organic solvent in contact with the sugar solution while at the reaction temperature and then into a settling tank, and separating a solvent layer containing 5-hydroxymethyl furfural from an aqueous phase layer.

4. In the process of claim 1, saturating the organic solvent with water before introducing it into reacting contact with the sugar solution.

References Cited in the file of this patent

UNITED STATES PATENTS

| | | |
|---|---|---|
| 2,498,918 | Haworth et al. | Feb. 28, 1950 |
| 2,750,394 | Peniston | June 12, 1956 |